(12) United States Patent
Cook

(10) Patent No.: US 7,184,526 B1
(45) Date of Patent: Feb. 27, 2007

(54) TELEPHONE-BASED SELECTION, ORDERING, AND BILLING OF DIGITAL CONTENT DELIVERED VIA A NETWORK

(75) Inventor: Fred S. Cook, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 351 days.

(21) Appl. No.: 10/245,457

(22) Filed: Sep. 18, 2002

(51) Int. Cl.
*H04M 11/00* (2006.01)
*H04M 15/00* (2006.01)

(52) U.S. Cl. .............................. 379/93.12; 379/121.03; 379/127.01; 705/26; 705/30

(58) Field of Classification Search ........... 379/114.01, 379/127.01, 126, 115.01, 121, 93.12, 100.03–100.04, 379/100.12, 100.16–100.17, 102.02–102.03; 705/26, 30; 725/1, 4, 86–87, 105, 109
See application file for complete search history.

(56) References Cited

U.S. PATENT DOCUMENTS

| | | | | |
|---|---|---|---|---|
| 5,594,789 A * | 1/1997 | Seazholtz et al. | ........ | 379/88.02 |
| 5,654,747 A * | 8/1997 | Ottesen et al. | .................. | 725/1 |
| 5,694,459 A * | 12/1997 | Backaus et al. | ....... | 379/127.01 |
| 5,737,414 A | 4/1998 | Walker et al. | | |
| 5,745,556 A | 4/1998 | Ronen | | |
| 5,757,784 A * | 5/1998 | Liebowitz et al. | .......... | 370/321 |
| 5,790,173 A * | 8/1998 | Strauss et al. | .............. | 725/114 |
| 5,905,736 A | 5/1999 | Ronen et al. | | |
| 5,917,537 A * | 6/1999 | Lightfoot et al. | .............. | 725/4 |
| 5,956,482 A * | 9/1999 | Agraharam et al. | ........ | 709/203 |
| 6,009,465 A * | 12/1999 | Decker et al. | ................. | 725/82 |
| 6,061,436 A | 5/2000 | Bauer et al. | | |
| 6,381,318 B1 | 4/2002 | Nada et al. | | |
| 6,690,407 B1 * | 2/2004 | Parker et al. | ............ | 348/14.01 |
| 2001/0024497 A1 * | 9/2001 | Campbell et al. | ...... | 379/265.09 |
| 2002/0152267 A1 * | 10/2002 | Lennon | ....................... | 709/203 |
| 2003/0028890 A1 * | 2/2003 | Swart et al. | ................... | 725/91 |
| 2003/0028896 A1 * | 2/2003 | Swart et al. | ................. | 725/127 |
| 2003/0040962 A1 * | 2/2003 | Lewis | .......................... | 705/14 |
| 2004/0131161 A1 * | 7/2004 | Schwartz et al. | ............. | 379/68 |
| 2004/0199387 A1 * | 10/2004 | Wang et al. | ................. | 704/243 |
| 2005/0027591 A9 * | 2/2005 | Gailey et al. | ................. | 705/14 |
| 2005/0144641 A1 * | 6/2005 | Lewis | ......................... | 725/60 |
| 2005/0193417 A1 * | 9/2005 | Bankers et al. | ............... | 725/60 |
| 2005/0198677 A1 * | 9/2005 | Lewis | ......................... | 725/87 |

* cited by examiner

Primary Examiner—Binh K. Tieu

(57) ABSTRACT

A content delivery system for delivering digital multimedia content to a premise appliance of a user comprises an intelligent voice response (IVR) unit which is responsive via a public switched telephone network to a premise telephone of the user. The IVR unit presents a predetermined menu for selecting a transaction to receive the digital multimedia content. The IVR unit also obtains an identification of the user (such as the user's telephone number via automatic number identification or caller ID). A content server is coupled to the IVR unit for transferring the digital multimedia content to the premise appliance. A telephone billing system is coupled to the IVR unit or the content server. The telephone billing system creates a call record corresponding to the selected transaction and to a telephone billing account corresponding to the user identification. The call record contains usage information for the transaction which can later be used by the billing system to determine a charge for the transaction. The content server signals the billing system in the event of an incomplete transmission for adjusting the call record.

16 Claims, 3 Drawing Sheets

TELEPHONE-BASED SELECTION, ORDERING, AND BILLING OF DIGITAL CONTENT DELIVERED VIA A NETWORK

CROSS REFERENCE TO RELATED APPLICATIONS

This application is related to co-pending and commonly assigned application Ser. No. 10/058,517, filed Jan. 28, 2002, entitled "Obtaining On-Demand Goods and Services Using Video Telephony" which is incorporated herein by reference in its entirety.

STATEMENT REGARDING FEDERALLY SPONSORED RESEARCH

Not Applicable.

BACKGROUND OF THE INVENTION

The present invention relates in general to delivery of digital multimedia content via a data network such as the Internet, and, more specifically, to simplified content selection and collection of access charges using infrastructure of the telephone system.

With the proliferation of broadband (i.e., high-speed), always-on Internet connections such as digital subscriber line (DSL) and cable modem access, the Internet is becoming a practical channel for distributing digital multimedia content to increasing numbers of users (by download or real-time streaming). In addition to standard personal computer equipment that may be used to view and/or listen to multimedia content such as movies, live events, music videos, and Internet radio broadcasts, special dedicated hardware devices have been introduced for interfacing with the Internet, such as the set-top box. Nevertheless, the implementation of such use has been slow due to several logistical constraints.

In obtaining content that is encoded in a manner appropriate for their hardware and software configurations, requesting users may be required to possess certain computer knowledge and/or may have to expend extensive set-up time and effort. Furthermore, much of the desirable multimedia content is not available for free, so the user must make an arrangement for paying for the received content. One potential method is to pay by credit card, but many users are reluctant to transmit a credit card number for authorization over the Internet due to security concerns. As an alternative, a user can sign up with a content service wherein the actual payment process is arranged in advance. However, the user is then limited to the content available from the content service(s) that they have joined in advance and they must deal with complicated, separate billings whenever a plurality of separate services are used. Furthermore, access to the content will not be granted until the sign up process is completed which may take a significant length of time.

There have been several impediments from the content provider perspective as well. In the case of a small content provider, the cost of a payment system and/or a membership sign-up process may be impractical. Even for a large provider, the elaborate invoicing and digital rights management (DRM) systems contribute to high costs. Furthermore, the business opportunity represented by infrequent users who might wish to purchase access to one content file but that do not wish to sign up to a service is lost.

SUMMARY OF THE INVENTION

The present invention has the advantages of greater convenience and low cost in a system for selecting, ordering, and paying for access to digital multimedia content, wherein a secure telephone connection is used to select content and request access. In addition, the telephone billing system provides a unified financial settlement system for access charges even when multiple content providers are used.

In one aspect of the invention, a content delivery system for delivering digital multimedia content to a premise appliance of a user comprises an intelligent voice response (IVR) unit. The IVR unit is responsive via a public switched telephone network to a premise telephone of the user. The IVR unit presents a predetermined menu for selecting a transaction to receive the digital multimedia content. The IVR unit also obtains an identification of the user (such as the user's telephone number via automatic number identification or caller ID). A content server is coupled to the IVR unit for transferring the digital multimedia content to the premise appliance. A telephone billing system is coupled to the IVR unit and the content server. The telephone billing system creates a call record corresponding to the selected transaction and to a telephone billing account corresponding to the user identification. The call record contains usage information for the transaction. The content server signals the billing system in the event of an incomplete transmission for adjusting the call record.

DETAILED DESCRIPTION OF PREFERRED EMBODIMENTS

Figure 1:
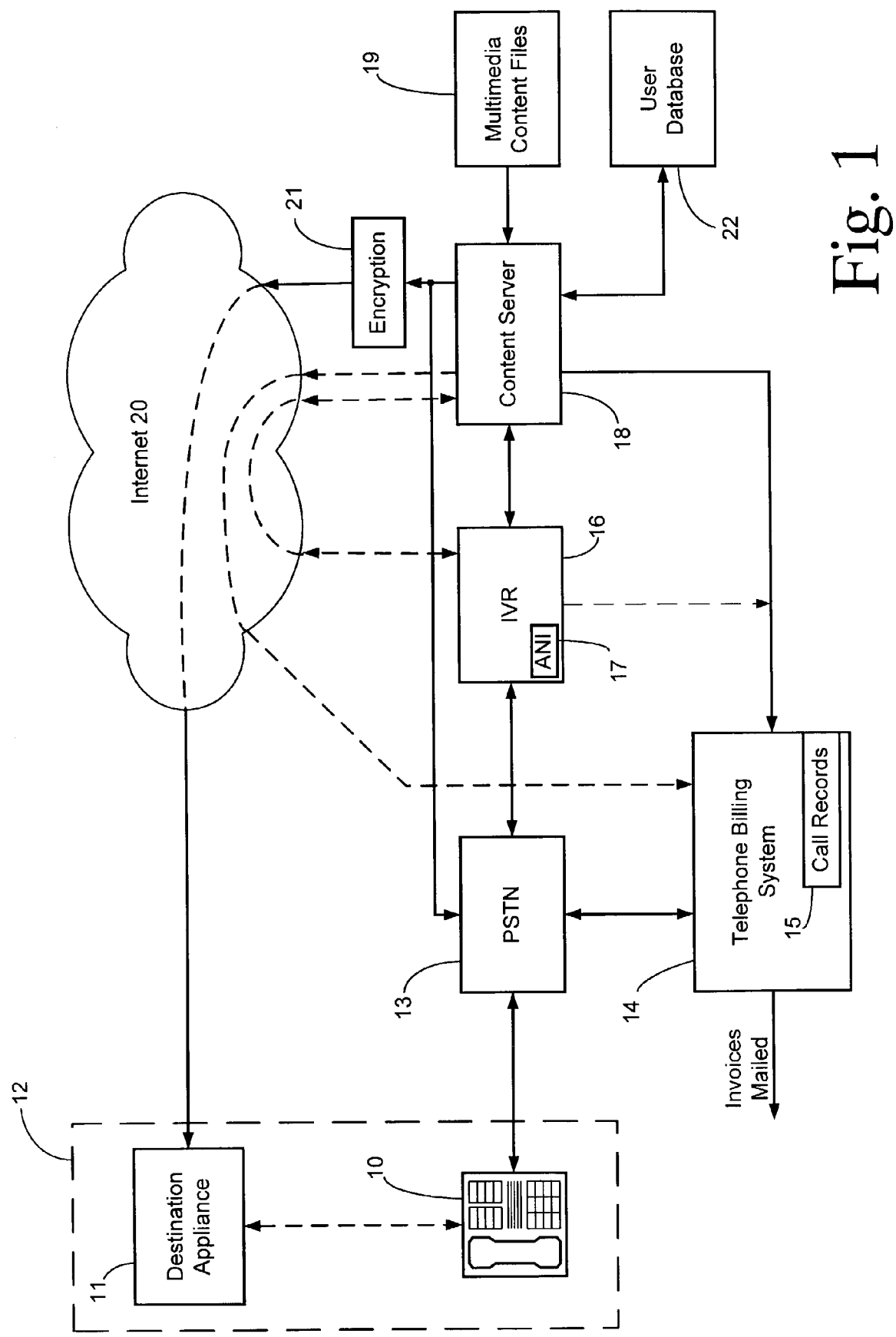
FIG. 1 is a block diagram generally showing the system of the present invention.

Referring to FIG. 1, a user telephone 10 and a destination appliance 11 may be located at a user premises 12. Telephone 10 may be a standard wired instrument connected by a land line to the public switched telephone network (PSTN) 13. Alternatively, telephone 10 may be a mobile wireless phone (e.g., cellular phone) not restricted to use at premises 12. Destination appliance 11 may be comprised of a personal computer or a dedicated multimedia device such as a set-top box for using in association with a television monitor, for example. It is coupled to a public or private data network such as the Internet 20 for receiving multimedia files (e.g., streams or downloads) to be reproduced for the user. Appliance 11 has an assigned data network address such as an IP address through which it receives any streams or downloads from Internet 20. While it is convenient in the present invention to associate an IP address of appliance 11 with a telephone number (i.e., E. 164 number) located at the same premises, it is not necessary. Either or both of telephone unit 10 and appliance 11 may be mobile devices, provided that a telephone number for billing purposes and an IP address for delivering the multimedia file are available.

PSTN 13 is coupled to a telephone billing system 14 operated by a telephone company (e.g., a local exchange carrier or an inter-exchange carrier) providing telephone service within PSTN 13. Billing system 14 has the conventional capabilities of accumulating usage information (e.g., service type and elapsed time), calculating charges, and regularly invoicing customers for telephone service itself and for third party services accessed via a telephone call (e.g., "900 number" services). Charges for third party services are collected by the telephone company and then disbursed to the third party providers. Charges are accumulated by way of call records 15 that are created and processed electronically within a private computer system.

The present invention for delivering multimedia content and then obtaining payment via telephone billing system 15 includes an intelligent voice response (IVR) unit 16 which may be comprised of commercially available equipment and which is programmable to provide a desired interface between a telephone user and computerized devices, such as a content server 18. IVR unit 16 preferably incorporates an ANI unit 17 for receiving ANI signals identifying the originating telephone number of a calling user. The user dials a "transport" telephone number which connects them with IVR unit 16. The telephone number is publicized as an access number to the multimedia content delivery system of the present invention. IVR unit 16 presents a predetermined interactive menu using recorded or synthesized speech to present various choices to the user. The user may indicate various selections within the menu by pressing buttons on the dial pad to generate DTMF tones and/or by spoken commands if IVR unit 16 is capable of speech recognition, for example. The interactive menu includes selection items for identifying a desired multimedia content file to be obtained via electronic delivery, for example. The user may browse through a hierarchical listing of available files or may directly input a numerical or verbal identifier of the desired selection, if known by the user in advance (e.g., from an advertisement).

When the selection process is completed, a transaction is initiated with content server 18 to transmit the selected digital multimedia content from multimedia source files 19 stored in association with content server 18. Rather than a point-to-point transmission, a multicasting transmission can be used. In that case, content server 18 sends the needed "join" information (e.g., multicast group ID or source address and decryption information) allowing the user to join a multicast stream in-progress. Packet generalization may be used to allow a user to join an existing multicast and to play the media from the beginning at any join point.

The file transmission may be delivered via Internet 20 (or other public data network), in which case the file may preferably be encrypted in an encryption block 21. The Internet transmission is sent to an IP address corresponding to destination appliance 11 which may be determined from a user database 22, for example. Database 22 can be attached to IVR unit 16 and/or content server 18 or may be split between them (e.g., when IVR unit 16 and content server 18 are controlled by different providers). If the IP address information is not available from database 22, then IVR unit 16 may query the user for the IP address.

IVR unit 16 and content server 18 may be operated by a particular content provider and may be directly interconnected as part of a private computer system, for example. Alternatively, IVR unit 16 may be operated by a separate entity (e.g., a telephone company) or at a remote location of the content provider. Thus, communication between IVR unit 16 and content server 18 may be alternatively accomplished via Internet 20.

Database 22 may also contain information concerning the type of file encoding that is required by a particular user (e.g., file format, type of file compression, etc.) and the transmission can be automatically adjusted to provide the appropriate encoding. If the necessary information in not available from database 22, then it can be obtained by a query forwarded to the user via IVR unit 16.

Database 22 may preferably contain records corresponding to each telephone number from which an access request is received. Each record is preferably updated according to IP address and encoding information entered by a user for a desired transaction. A registration process may also be used with user database 22 in order to set up the desired information pertaining to an individual user.

In an alternative embodiment, a connection from content server 18 to PSTN 13 allows file transmission to be accomplished using the existing telephone call from the user. Destination appliance 11 may preferably be connected to telephone 10 and/or the telephone line leading to PSTN 13 in order to receive the file transfer (e.g., via a modem and dial-up networking protocols).

Due to the greater privacy of a telephone line connection, encryption may not be necessary for that embodiment. For delivery over a public data network, however, encryption is highly desirable. Encryption algorithms rely on one or more keys to encode and then decode the encrypted data. At least one of the keys should be known only to the sending and/or receiving parties. In the present invention, a key is employed that is based on details of the transaction that are known only to the user and to the content provider by virtue of the private nature of the telephone connection between telephone 10 and IVR unit 16. Preferably, the key incorporates user identification in the form of the user's telephone number as obtained by ANI unit 17. In addition, the key may incorporate a content provider identifier (e.g., ASCII code of the content provider's name) combined with the user identifier in a predetermined manner. This encryption method is highly secure since the ANI telephone number and the content provider identifier are not included in the Internet transmission of the multimedia file. A third party intercepting the Internet transmission would need to know which telephone made the request for the content and the identifier of the content provider in order to determine the necessary key to decrypt the file, which is very unlikely. The intended user at the destination IP address, on the other hand, possesses the necessary information and can provide it to destination appliance 11 to enable the decryption of the received file.

In order to obtain payment for access to the desired multimedia file, content server 18 (or alternatively IVR unit 16) communicates with telephone billing system 14 for initiating call records reflecting the usage associated with accessing the file. The connection from content server 18 (or alternatively IVR unit 16) to billing system 14 may be by a private connection or via Internet 20, for example. Based on the recorded usage information (e.g., service type, connect time, and/or bulk files transferred), the billing system periodically calculates payments due and adds them to an invoice or bill sent to the user (e.g., on a customer's monthly telephone bill).

Figure 2:
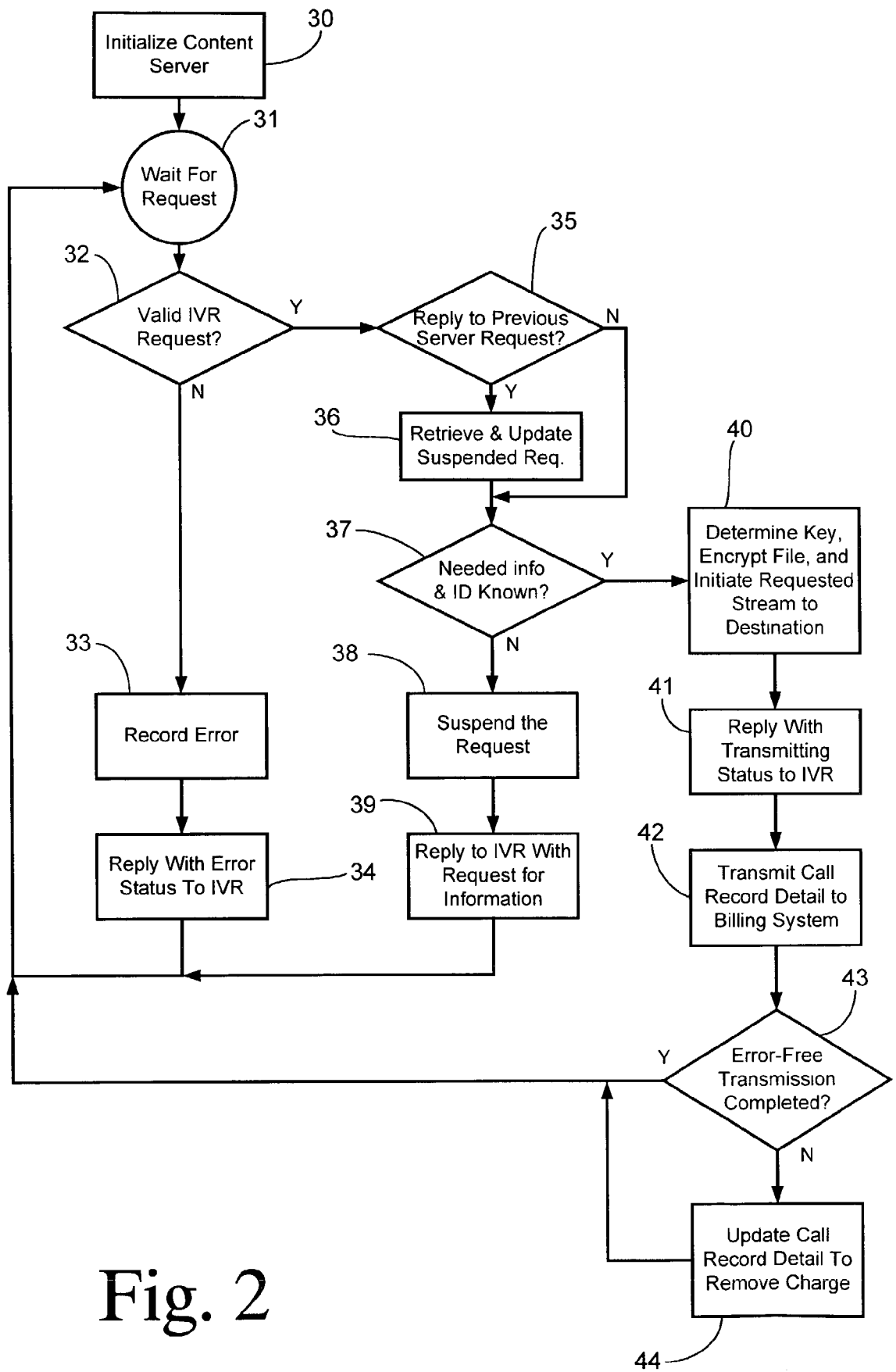
FIG. 2 is a flowchart of a preferred method of operation for the content server of the present invention.

One embodiment of a method of operation for the content server is shown in FIG. 2. The server is initialized in step 30 and then waits for a request in step 31. When a request is received from the IVR unit, it is checked for validity in step 32. If not valid then an error is recorded in step 33 and a reply message is sent with the error status to the IVR unit in step 34. Then a return is made to step 31 to wait for the next request.

If the IVR request is valid, then a check is made in step 35 to determine whether this request constitutes a reply of the IVR unit to an earlier (suspended) request by the content server for more information from the user. If it is, then the suspended request is retrieved and updated with the new information in step 36; and if not, then step 36 is skipped. In step 37, a check is made to determine whether all needed information for the transaction, including the requesting ID, is known (e.g., whether a record exists in the user database corresponding to the ID which specifies an IP address and, if needed, the type of file format or encoding to be used for that user). If it is the first time that the user has accessed the content provider from the telephone number (i.e., requesting ID) being used or if the database record has incomplete information, then the request is suspended (i.e., retained in an inactive state) and a reply message is sent to the IVR unit in step 39 to request the needed information to complete the request. Alternatively, the content server need not retain any information about an incomplete request if the IVR unit formats a completely new request after obtaining the missing information.

If the requesting ID is known and no further user information is needed by the content server, then the server determines the encryption key to be used, encrypts the requested multimedia file using that key, and initiates streaming of the encrypted file to the destination (e.g., the IP address obtained from the user database or from the user via the IVR unit) in step 40. If the file is delivered by way of the existing telephone call connection rather than over the Internet, then encryption is typically not necessary.

Once the requested stream is initiated, a reply message is sent in step 41 to the IVR unit providing the transmission status so that the user can be given an acknowledgement over the telephone call that the stream is in progress. In step 42, the call record detail corresponding to the streamed file (e.g., user telephone number, content provider ID, file ID, destination IP address, media service type, and connection time) is transmitted to the telephone billing system. In the preferred embodiment, the call record detail information may be sent by the content server, but it could alternatively be sent by the IVR unit. In step 43, a check is made when file streaming ceases to determine whether an error-free and complete transmission of the requested file was achieved. If yes, then a return is made to step 31 to await the next request. If no, then updated call record detail is transmitted to the telephone billing system in step 44 to update the call record or generate a reversal record, thereby preventing the corresponding charge from appearing on the user's telephone bill. The update may be comprised of a re-marking of the call detail termination status to an appropriate error. The adjustment to the call detail termination status must occur after the initial call detail recording because the initial recording is usually required to be maintained in a non-modified form. The content server and/or the IVR unit should also log the error together with the original request and before and after images of the call record.

Figure 3:
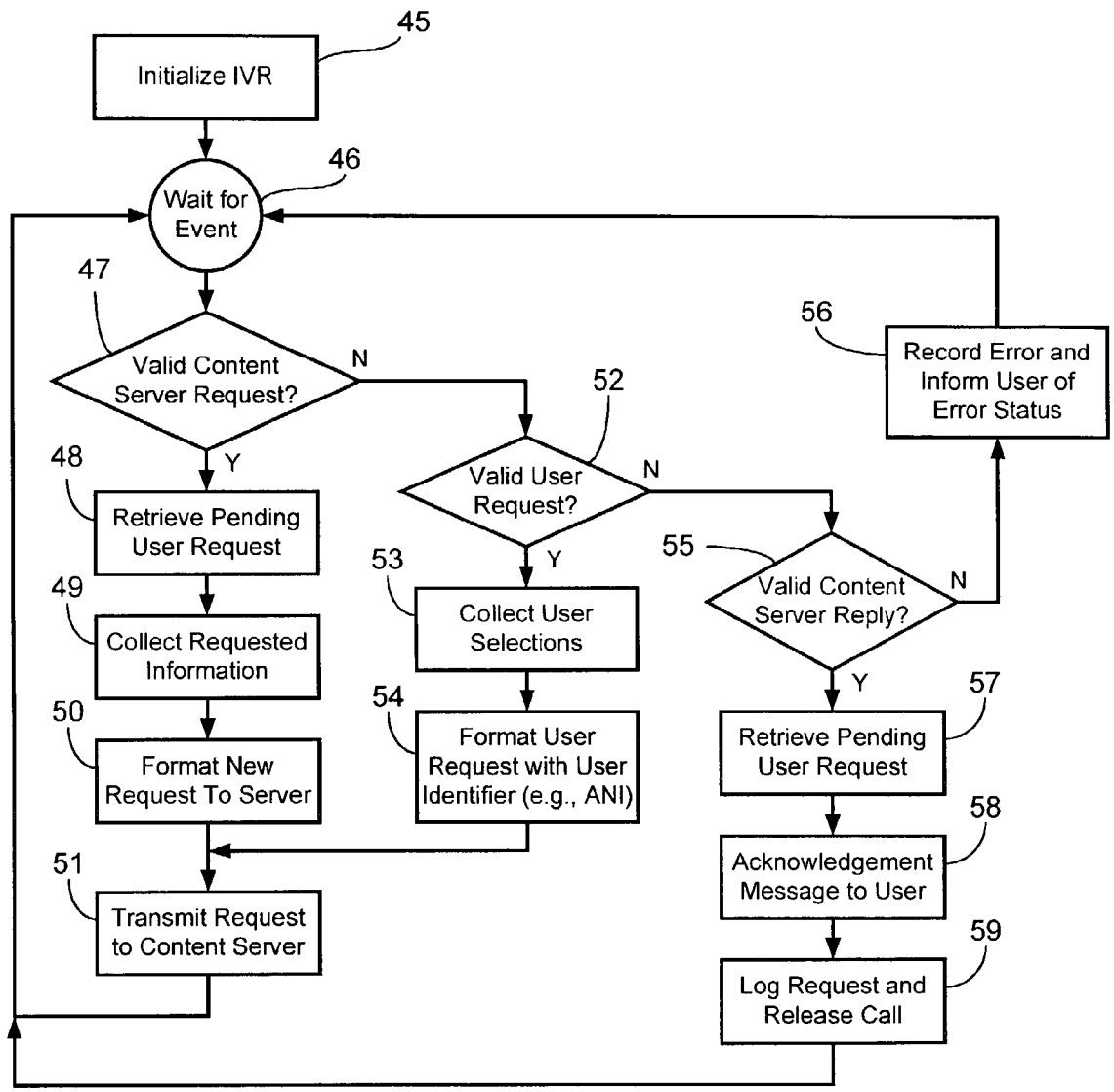
FIG. 3 is a flowchart of a preferred method of operation for the intelligent voice response unit of the present invention.

Operation of the IVR unit is shown in FIG. 3. The IVR unit is initialized in step 45 and it then waits for events to occur in step 46. Upon an incoming event, a check is made in step 47 to determine whether the event is a valid request for supplemental information from the content server. If so, then information about the pending request that was already stored in the IVR unit is retrieved in step 48. Prompts are provided to the user over the telephone call in step 49 to collect the requested information, which is then supplied by the user via touch tone signals or speaking the information. In step 50, the IVR unit formats a new file request for the content server. The request is transmitted to the server in step 51 and the IVR unit returns to step 46 to wait for additional events.

If an event is not a content server request, then a check is made in step 52 to determine whether the event is a valid user request. If yes, then the IVR unit proceeds through its user interface in step 53 to collect the file selection(s) of the user and the identity of the user (e.g., by referring to the ANI unit for the user's telephone number). In step 54, a user request is formatted in response to the user selections and the user identifier. The request is transmitted to the server in step 51 and the IVR unit returns to step 46 to wait for additional events.

If an event is not a valid user request, then a check is made in step 55 to determine whether the event is a valid reply message from the content server. If not, then an error is recorded in step 56 and an error status message is provided to the user. If yes, then the pending user request is retrieved in step 57 so that an acknowledgement message can be provided to the user over the telephone call in step 58. A log entry is created in an activity log file in step 59 and then the telephone call is released.

What is claimed is:

1. A content delivery system for delivering digital multimedia content to a premise appliance of a user via a digital data network, comprising:

an intelligent voice response (IVR) unit responsive via a public switched telephone network to a premise telephone of said user, wherein said IVR unit presents a predetermined menu for selecting a transaction using said premise telephone to receive said digital multimedia content using said premise appliance, and wherein said IVR unit obtains an identification of said user;

a content server coupled to said IVR unit and to said digital data network for transferring said digital multimedia content to said premise appliance via said digital data network separate from said public switched telephone network and said premise telephone;

a telephone billing system coupled to at least one of said IVR unit and said content server, said telephone billing system creating a call record corresponding to said selected transaction and to a telephone billing account corresponding to said user identification, said call record containing usage information for said transaction;

wherein said content server signals said billing system in the event of an incomplete transmission for adjusting said call record.

2. The system of claim 1 wherein said IVR unit includes automatic number identification (ANI) capability for obtaining said user identification.

3. The system of claim 1 wherein said IVR unit prompts said user to input said user identification.

4. The system of claim 1 wherein said digital data network is comprised of the Internet.

5. The system of claim 1 wherein said transferred digital multimedia content is encrypted using a key incorporating said user identification.

6. The system of claim 5 wherein said key further incorporates an identifier of said content server.

7. The system of claim 1 wherein said call record comprises information identifying said transaction and said content server.

8. The system of claim 7 wherein said information further comprises a call termination status, and wherein said call termination status is comprised of an error code if said incomplete transmission occurs.

9. A method for delivering digital multimedia content to a premise appliance of a user, comprising the steps of:
- an intelligent voice response (IVR) unit receiving a telephone call from a premise telephone of a user via a public switched telephone network;
- said IVR unit presenting a predetermined menu for said user to select a transaction to receive said digital multimedia content;
- said user selecting a transaction using said premise telephone;
- said IVR unit obtaining an identification of said user;
- a content server coupled to said IVR unit transferring said digital multimedia content to said premise appliance via a digital data network;
- said user receiving said digital multimedia content using said premise appliance separate from said public switched telephone network;
- creating a call record in a telephone billing system, said call record corresponding to said selected transaction and to a telephone billing account corresponding to said user identification, said call record containing predetermined usage information for said transaction;
- said content server detecting if an incomplete transmission of said digital multimedia content occurs and signaling said billing system of such an occurrence; and
- said billing system adjusting said call record in response to an incomplete transmission so that said user is not charged for said selected transaction.

10. The method of claim 9 further comprising the step of: collecting automatic number identification (ANI) data from said public switched telephone network as said user identification.

11. The method of claim 9 further comprising the step of: said IVR unit prompting said user to input said user identification.

12. The method of claim 9 wherein said digital data network is comprised of the Internet.

13. The method of claim 9 further comprising the step of: encrypting said transferred digital multimedia content using a key incorporating said user identification.

14. The method of claim 13 wherein said key further incorporates an identifier of said content server.

15. The method of claim 9 wherein said call record comprises information identifying said transaction and said content server.

16. The method of claim 15 wherein said information further comprises a call termination status, and wherein said call termination status is comprised of an error code if said incomplete transmission occurs.

* * * * *